Oct. 21, 1958     G. CLARK     2,857,111
ROTOR BLADES AND BLADE MOUNTING
MEANS FOR GRINDING MILLS

Filed Jan. 18, 1956     3 Sheets-Sheet 1

Inventor
GEOFFREY CLARK
By
Mead, Browne, Schuyler & Beveridge
Attorneys

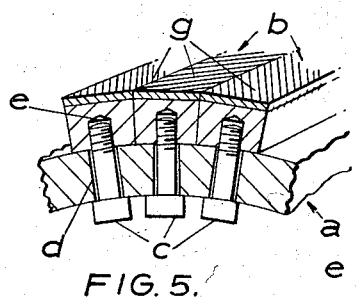
FIG. 5.
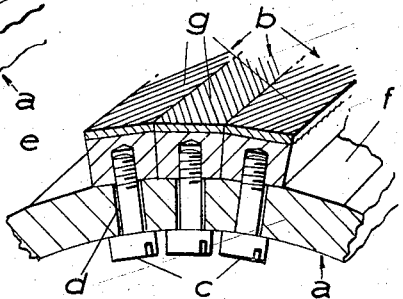
FIG. 6.
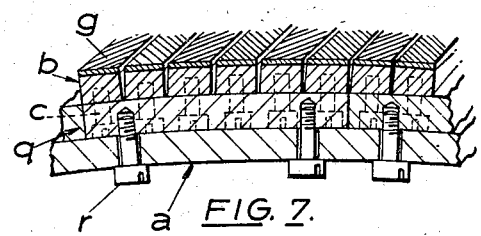
FIG. 7.
FIG. 8.
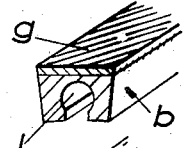
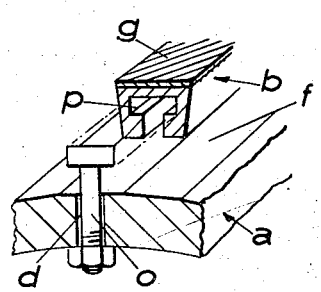
FIG. 10.
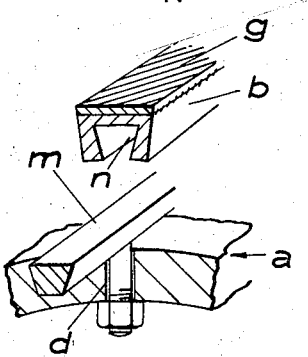
FIG. 9.
Inventor
GEOFFREY CLARK
By
Mead, Browne, Schuyler & Beveridge
Attorneys

United States Patent Office 2,857,111
Patented Oct. 21, 1958

2,857,111

ROTOR BLADES AND BLADE MOUNTING MEANS FOR GRINDING MILLS

Geoffrey Clark, Hull, England, assignor of one-half to Unipulver Limited, Hull, England, a British company Application January 18, 1956, Serial No. 559,985

Claims priority, application Great Britain January 21, 1955

4 Claims. (Cl. 241—294)

The present invention relates to grinding, pulverising, crushing and the like machines wherein material such as cereals, minerals, chemicals or other granular substances, are reduced in size.

In machines of this kind grinding, pulverising or crushing is generally effected by the relative rotation of a bladed rotor and a stator.

In view of the critical clearances between the blades of the rotor and those of the stator, the mounting of the blades in such mills is a feature which must receive careful attention. Previously it has been the custom, with the rotor blades, which are subjected to considerable centrifugal force, to provide them with a shaped contour in their lower regions adapted to engage with a correspondingly shaped recess formed in the outer periphery of the rotor, retaining dogs or similar means inserted from the outer surface serving to keep the blades in place after positioning.

Such a construction was costly in view of the considerable amount of intricate machining necessary in forming the rotor, and in view of the difficulty in producing blades, particularly those of special metals such as those of the tungsten carbide type, of unusual cross-section.

Furthermore this form of construction made the production of a fully-bladed rotor impossible, due to the fact that lands had to be left between individual blades to accommodate the dogs or other retaining means.

One object of the present invention is to provide a rotor blade mounting which avoids these disadvantages and which involves a simpler construction; so that less complicated rotors and blades can be employed, and the overall cost of production reduced. Furthermore, the mounting of the present invention makes possible fully- or substantially fully-bladed rotors, and renders maintenance a simpler matter.

According to the present invention, the blades are mounted flush on the outer periphery of the rotor and are held in position by retaining means passing through radial holes provided in the rotor periphery and engaging in recesses provided in the under faces of said blades.

The retaining means may be set screws, in which case the recesses in the under faces of the blades are constituted by blind, tapped holes, within which the screws engage. Preferably the radial holes in the rotor are clearance holes, one end of the retaining means abutting against the inner surface of the rotor.

Although the blades may be spaced around the outer periphery of the rotor as desired, or as determined by any particular operating condition, in preferred embodiments, they are arranged to give a fully- or substantially fully-bladed rotor.

The under sides of the blades may be arcuate in shape, adapted to the contour of the rotor periphery. Alternatively, the blades may be of rectangular cross-section so that their under sides are flat, in which case the rotor periphery should be provided with a series of flats, so that the abutting faces of the rotor and blades are complementary. Furthermore, the blades may be of substantially rectangular cross-section, giving a slight spacing of the blades around the periphery, or alternatively they may be of tapered cross-section so that a fully-bladed rotor is presented, i. e. one in which the cutting blade surface extends around the complete rotor periphery.

The blades themselves may be mounted upon a number of segmental elements built up into a complete unit on the outer periphery of the rotor, there being a plurality of blades per element. In such a case the retaining means may be constituted by two sets of screws; one passing through the radial holes in the rotor periphery and holdinng the segmental elements on to the rotor, and the other set passing through the elements and engaging in the recesses on the under faces of the blades.

In preferred forms of construction the outer faces of the blades are provided with grinding or cutting surfaces of hard material of the tungsten carbide type.

By providing apertures in the end plates of the rotor, ready access to the inside of the rotor and the retaining means is obtained, and facilitates the easy mounting and removal of the blades. Cover plates may be provided for sealing the apertures when the machine is to be operated.

The invention will now be further described by way of example with reference to the accompanying drawings, in which:

Fig. 5 is a view similar to Fig. 3 of a construction in which tapered blades are employed to give a fully-bladed rotor;

Fig. 6 is a view similar to Fig. 4 but again tapered blades are employed to give a fully-bladed rotor;

Fig. 7 is a development of the construction illustrated in Fig. 3 but showing a rotor having segmental elements mounted on the main body of the rotor;

Figs. 8, 9 and 10 are details in perspective showing various retaining means and the corresponding recesses provided on the under face of the rotor blades.

Like references indicate like parts on all figures.

In the mounting of the present invention, blades $b$ are mounted flush on the periphery of the rotor $a$ of the grinding, pulverising or crushing mill, and are held in position by retaining means.

In the construction shown in Figs. 1 to 7 these means are formed by screws $c$ which pass through radial clearance holes $d$ formed in the rotor body. These screws $c$ engage in blind, tapered holes $e$ provided in the under faces of each blade $b$.

Figure 1:
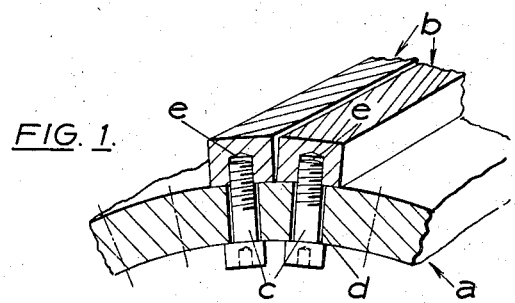
Fig. 1 is a fragmentary perspective sectional view of a rotor of a mill of the type described, having blades mounted thereon according to the present invention, two blades only being shown for the sake of clarity.
Figure 3:
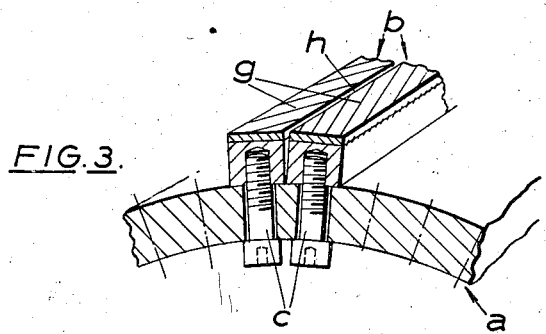
Fig. 3 is a similar view of a preferred embodiment, showing blades having greatly enhanced wearing properties.

In the embodiments shown in Figs. 1 and 3, the blades $b$ whilst of substantially rectangular cross-section, have their under faces of arcuate form, to correspond to the contour of the rotor periphery against which they intimately abut.

Figure 2:
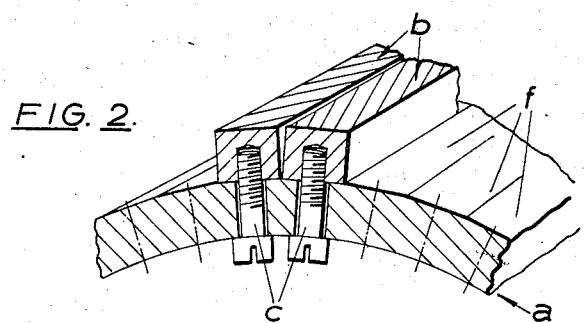
Fig. 2 is a similar view of another embodiment, the rotor periphery having been formed into a series of flats.
Figure 4:
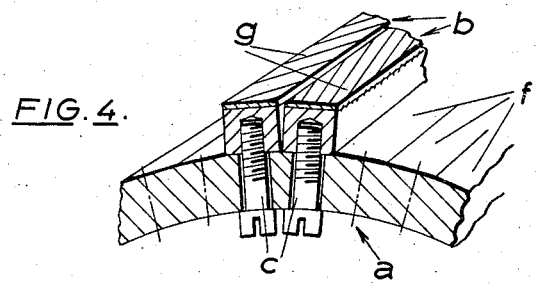
Fig. 4 is a similar view of a preferred construction, combining the features of Figs. 2 and 3.

In the constructions of Figs. 2 and 4, the blades $b$ are completely rectangular in cross-section, and in this case the rotor periphery is provided with a series of flats $f$, so that once again the abutting faces of the rotor blades lie intimately one against the other.

So that the mill may give a uniformly fine grade of treated material even after long periods without adjustment or replacement of blades, in the preferred constructions of Figs. 3 to 10 the blades are provided with grinding or cutting surfaces $g$ of hard material of the tungsten carbide type. By using only a surfacing of such material, instead of forming the whole blade therefrom, the overall cost of the blade is reduced.

Fig. 5 shows an arrangement similar to Fig. 3, but the blades $b$ are tapered along radii of the mill rotor, so that they present an outer surface broader than their inner one. In this way the edges of the cutting surfaces of the blades abut against one another, and a continuous cutting periphery is formed around the rotor; so that a fully-bladed rotor is obtained, as distinct from the only substantially fully-bladed rotor of Fig. 3 in which slight gaps $h$ occur between the edges of the cutting surfaces of the blades. Similarly Fig. 6 shows the fully-bladed rotor technique applied to a rotor having a series of flats, such as that shown in Fig. 4.

The rotor may be constituted (as shown in Fig. 7) by a number of segmental elements $q$ mounted on the periphery of the main body of the rotor by means of screws $r$ passing through the radial holes formed in the rotor body. In this construction the blades $b$ are mounted on the outer-periphery of the rotor segmental elements $q$ by screws $c$ as before, although the heads of these screws are accommodated in suitable recesses formed in the underside of the elements $q$ so that a flush surface is provided between the co-operating parts of the rotor. Screws $c$ and $r$ together constitute the retaining means. With this arrangement a number of blades $b$ (six are shown in the drawing) are carried on each rotor element $q$ so that maintenance and replacement is simplified and expedited.

It will be appreciated that the relatively simple cross-section of the blades facilitates their production, for instance by drawing. The surfaces $g$ may be brazed on to the main bodies of the blades $b$ or attached in any other suitable manner.

Different types of retaining means are shown in Figs. 8 to 10. The first of these (Fig. 8) is formed by a circular rod $i$ extending along the length of each blade and having depending lugs $j$, which lugs pass through the clearance holes $d$ formed in the rotor and carry nuts $k$ on threaded end portions thereof, these nuts abutting against the inner surface of the rotor. The recess $l$ in the under face of each blade is formed in this case to accommodate the rod $i$ and its lugs $j$. In this manner, blades requiring adjustment or replacement are quickly removed from the rotor by slackening nuts $k$ and simply sliding the blades off the rods $i$.

A development of this arrangement is shown in Fig. 9. Here the rod is replaced by a bar $m$ of any suitable cross-section and a complementary recess $n$ is formed in the blade.

Yet another form of retaining means is shown in Fig. 10, in which bolts $o$ pass through the clearance holes $d$ formed in the rotor and are provided with nuts which abut against the inside of the rotor. The under faces of the blades are recessed at $p$ to take the heads of the bolts, so that, as before, the blades can be slid on or off the rotor after the nuts have been loosened. Alternatively the bolts $o$ can have profiled heads, so that by turning them through 90° after loosening the nuts, the blades may be lifted off the rotor.

Obviously other retaining means may be used. For instance, depending studs may be provided directly on the under face of the blades for engagement with the rotor as described above.

In all the embodiments it will be seen that the construction of the rotor $a$ is simplified, as it is not necessary to machine or form any complicated recesses therein.

In all the constructions shown the blades $b$ are shown abutting one another at their lower edges. However, it will be appreciated that they may be spaced singly or in groups around the rotor periphery in known manner.

Figure 11:
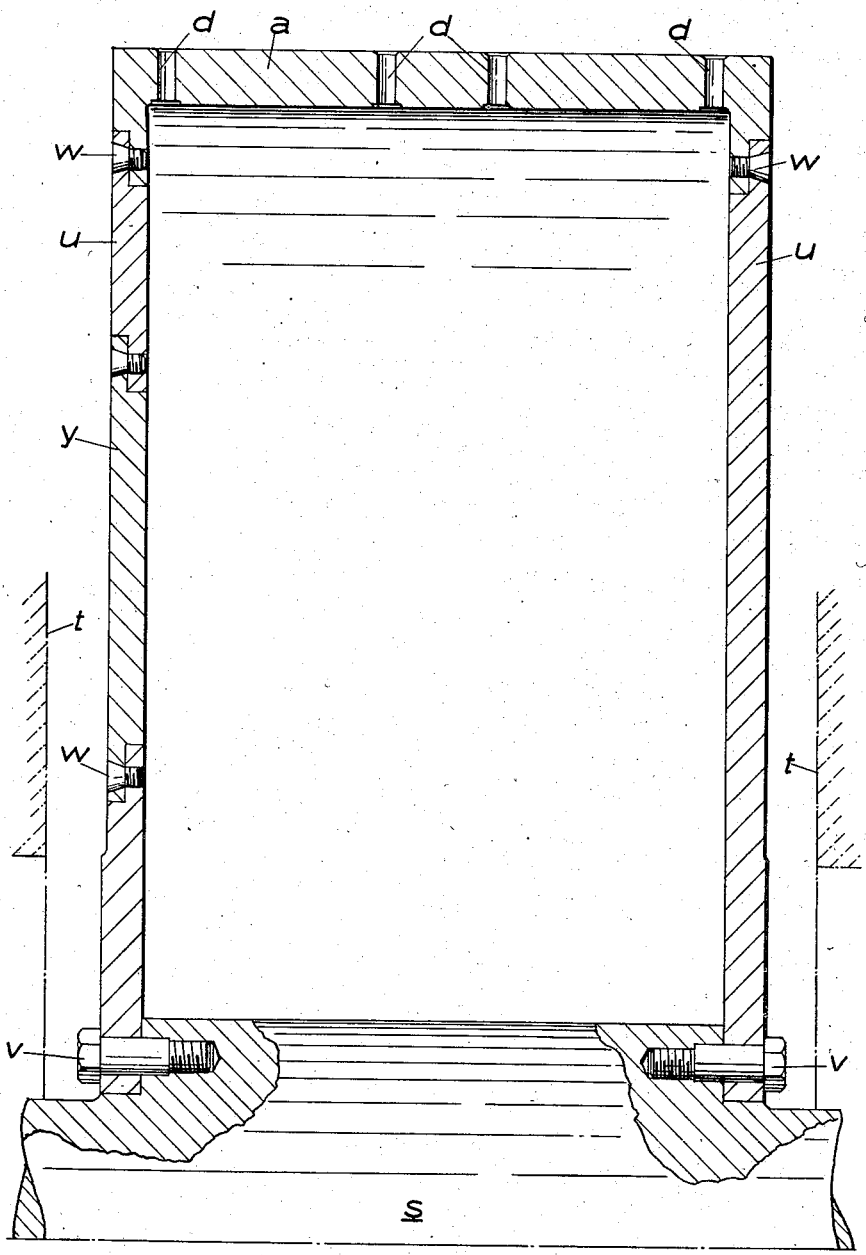
Fig. 11 illustrates a preferred form of rotor construction in section.

In Fig. 11, a rotor shaft $s$ is rotatably mounted in a stator casing $t$. Rotor $a$ is concentric with shaft $s$. Circular end plates $u$, concentric with shaft $s$ are secured to shaft $s$ by means of bolts $v$ and to rotor rim $a$ by means of screws $w$. Circular cover plates $y$ are fitted into apertures in end plates $u$ and are secured to end plates $u$ by means of screws $w$.

There are four cover plates $y$ in each end plate $u$, the panels being positioned at angular distances of 90° with respect to one another. Cover plates $y$ on one side of the rotor are displaced angularly through 45° with respect to the cover plates $y$ on the other side of the rotor.

The cover plates $y$ are readily removable from the end plates $u$ and give easy access to the inside surface of the rotor $a$ so as to facilitate mounting and replacement of the rotor blades $b$.

In Fig. 11, blades $b$ have been omitted since any one of the embodiments of Figs. 1 to 10 may be employed in conjunction with the embodiment of Fig. 11. Moreover, the clearance holes $d$ are shown only in the sectioned part of the rotor. The clearance holes $d$ are so positioned across the width of the rotor that two blades may be mounted in series across the rotor, there being two clearance holes per blade.

I claim:

1. In a grinding mill, a stator, a shaft rotatably mounted in said stator, a rotor concentric with said shaft, end plates securing said rotor to said shaft, a plurality of blades mounted flush on the outer periphery of and parallel to the axis of rotation of the rotor; retaining members passing through radial holes provided in the rotor and engaging in recesses provided in the blades, said retaining members being disposed at points adjacent to the edges of the rotor and at points intermediate the edges of the rotor, and cover plates closing apertures located in said end plates to permit easy access to the inner surface of the rotor.

2. A grinding mill as set forth in claim 1 wherein said outer periphery of said rotor is shaped to provide a series of flats which constitute a seating for said blades.

3. A grinding mill as set forth in claim 1 wherein each of said blades is of tapered cross section, the taper being from the outer surface of each blade to the inner surface thereof in contact with said outer periphery of said rotor, whereby a continuously-bladed rotor is obtained.

4. In a grinding mill, a stator, a shaft rotatably mounted in said stator, a rotor concentric with said shaft, end plates securing said rotor to said shaft, a plurality of blades mounted flush on the outer periphery of and parallel to the axis of rotation of the rotor, set screws passing through radial clearance holes provided in the rotor and engaging in blind tapped holes in the blades, said set screws being disposed at points adjacent to the edges of the rotor and at points intermediate the edges of the rotor, and cover plates closing apertures located in said end plates to permit easy access to the inner surface of the rotor.

References Cited in the file of this patent

UNITED STATES PATENTS

| 122,028 | Kahnweiler | Dec. 19, 1871 |
| 499,083 | Arnaud | June 6, 1893 |
| 669,048 | Spencer | Feb. 26, 1901 |
| 1,396,108 | Gilmore | Nov. 8, 1921 |
| 1,494,036 | Straub | May 13, 1924 |
| 2,552,037 | Elverum | May 8, 1951 |

FOREIGN PATENTS

| 134,420 | Sweden | Jan. 29, 1952 |
| 326,109 | Germany | Sept. 24, 1920 |
| 569,122 | Great Britain | May 4, 1945 |